United States Patent [19]
Bertrand et al.

[11] Patent Number: 5,383,367
[45] Date of Patent: Jan. 24, 1995

[54] DYNAMIC TEMPERATURE COMPENSATION FOR A PRESSURE CELL

[75] Inventors: Pierre Bertrand, Igny, France; Tourang Birangi, Eastlake; Joseph C. Nemer, Mayfield Heights, both of Ohio

[73] Assignee: Elsag International N.V., Amsterdam Zuidoost, Netherlands

[21] Appl. No.: 139,246

[22] Filed: Oct. 18, 1993

[51] Int. Cl.$^6$ .................. G01L 19/04; G01C 25/00
[52] U.S. Cl. .................................. 73/708; 364/571.03
[58] Field of Search .................. 73/708; 364/557, 558, 364/571.01, 571.02, 571.03

[56] References Cited

U.S. PATENT DOCUMENTS

| | | | |
|---|---|---|---|
| 4,289,035 | 9/1981 | Lee | 73/708 |
| 4,446,527 | 5/1984 | Runyan | 73/708 |
| 4,866,640 | 9/1989 | Morrison, Jr. | 364/571.03 |
| 4,956,795 | 9/1990 | Yamaguchi et al. | 73/708 |
| 5,135,002 | 8/1992 | Kirchner et al. | 364/571.03 |
| 5,191,327 | 3/1993 | Talmadge et al. | 364/571.02 |

*Primary Examiner*—Herbert Goldstein
*Assistant Examiner*—William L. Oen
*Attorney, Agent, or Firm*—Michael M. Rickin; Paul R. Katterle

[57] ABSTRACT

A method for compensating for the differences in temperature across a cell used to sense pressure. A microprocessor calculates a dynamic temperature factor signal by multiplying a signal representative of temperature change across the cell by a coefficient based on measurements made of the effect of temperature change on the cell. The dynamic temperature factor signal is then subtracted from the signal representative of the differential pressure sensed by the cell to thereby provide the dynamic temperature compensation.

15 Claims, 1 Drawing Sheet

DYNAMIC TEMPERATURE COMPENSATION FOR A PRESSURE CELL

FIELD OF THE INVENTION

This invention relates to pressure cells and more particularly to the compensation for differences in temperature across such a cell.

DESCRIPTION OF THE PRIOR ART

Differential pressure transmitters provide an analog output signal that varies from 4 to 20 milliamperes as a function of the differential pressure sensed by the transmitter. The pressure transmitter is designed to sense differential pressure over a predetermined range of pressure in engineering units such as psi. In order to sense the differential pressure the transmitter includes a pressure cell.

The analog output signal from the transmitter represents the sensed differential pressure as a percentage of the range of differential pressure that can be sensed by the transmitter. Therefore, when the sensed differential pressure is at 0%, the analog output signal is at 4 milliamperes and when the sensed differential pressure is at 100%, the analog output signal is at 20 milliamperes.

The differential pressure sensed by the cell in the transmitter changes with changes in temperature. The temperature of the cell can be measured and the changes in the sensing of differential pressure with temperature can be compensated for in the circuitry included in the transmitter.

Measuring the temperature of the cell does not compensate for any variations in the sensing of differential pressure which may be caused by differences in temperature across the pressure cell. Differences in temperature across the cell can occur as the temperature changes with time. It is desirable to also compensate for any differences in temperature across the cell as those differences also affect the differential pressure sensed by the cell and therefore the analog output signal of the transmitter. It is further desirable to compensate for differences in temperature across the cell without the use of another sensor and without affecting the measurement of pressure by the cell.

SUMMARY OF THE INVENTION

A method for correcting a signal representative of differential pressure sensed by a pressure cell for temperature differences across said pressure cell comprising the steps of:

a) calculating a dynamic temperature factor signal by multiplying a filtered signal representative of temperature change across said pressure cell by a coefficient based on measurements made of the effect of temperature change on said pressure cell; and b) subtracting from a filtered signal representative of the differential pressure sensed by said pressure cell said dynamic temperature factor signal.

An apparatus for correcting a signal representative of differential pressure sensed by a pressure cell for temperature differences across said pressure cell comprising:

a) means for calculating a dynamic temperature factor signal by multiplying a filtered signal representative of temperature change across said pressure cell by a coefficient based on measurements made of the effect of temperature change on said pressure cell; and b) means for subtracting from a filtered signal representative of the differential pressure sensed by said pressure cell said dynamic temperature factor signal.

DESCRIPTION OF THE PREFERRED EMBODIMENT

Figure 1:
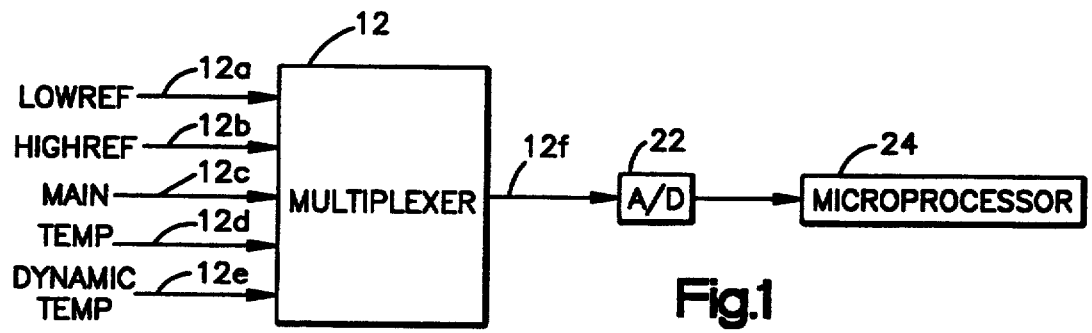
FIG. 1 shows a simplified block diagram for circuitry that provides the dynamic temperature compensation of the present invention.

Referring now to FIG. 1, there is shown a simplified block diagram of a part of the circuitry included in a pressure transmitter that will provide dynamic temperature compensation in accordance with the method of the present invention. The transmitter circuitry includes a multiplexor 12 having five inputs 12a to 12e which are associated with the present invention. Input 12a receives a low reference (LOW REF) analog signal and input 12b receives a high reference (HIGH REF) analog signal. The HIGH REF and LOW REF analog signals are predetermined voltages which are selected to be near the maximum and minimum voltage, respectively, representative of the entire range of differential pressure measured by the transmitter.

The transmitter also includes a pressure cell to measure the differential pressure. Input 12c receives an analog signal labeled MAIN which is representative of the differential pressure measured by the pressure cell. Input 12d receives an analog signal labeled TEMP which is representative of the temperature of the pressure cell. Input 12e receives an analog signal labeled DYNAMIC TEMP which is representative of the change in temperature across the pressure cell.

The transmitter circuitry further includes analog to digital (A/D) convertor 22 which is connected to the output 12f of multiplexor 12. Each of the analog input signals to the multiplexor appears at output 12f and is converted by A/D converter 22 to a digital signal. The digital signals at the output of A/D converter 22 are received at an input to a microprocessor 24. Associated with the microprocessor 24 is a read only memory (not shown) which has therein the dynamic temperature compensation method of the present invention in the form of instructions to be executed by the microprocessor.

Figure 2:
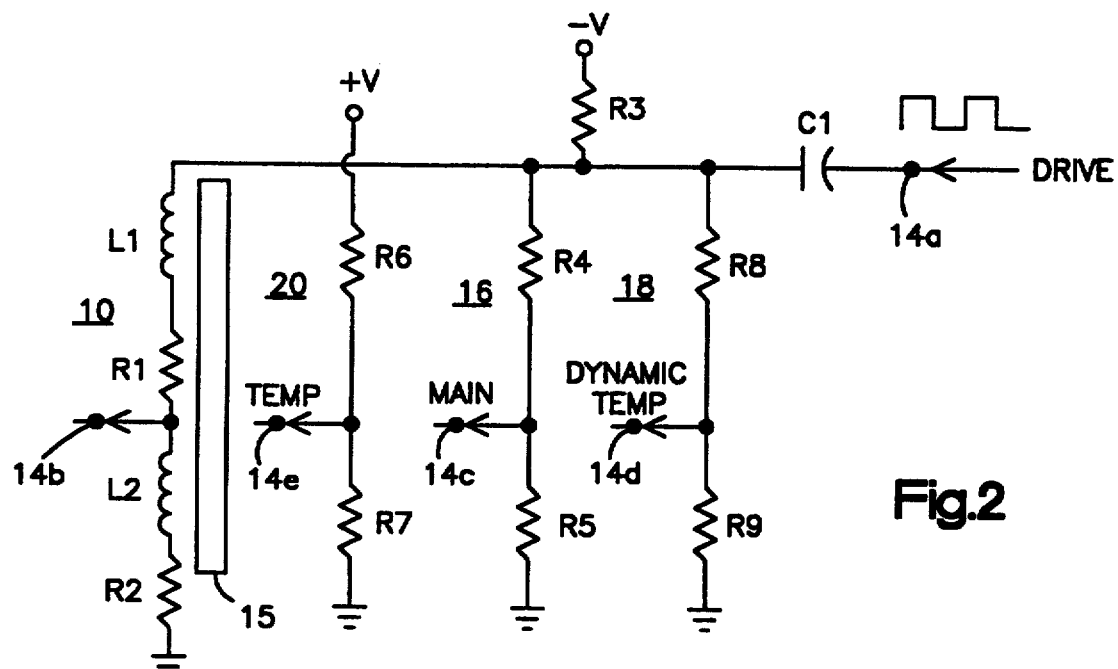
FIG. 2 shows a simplified electrical diagram for a pressure cell.

Referring now to FIG. 2, there is shown an electrical diagram for the pressure cell 14 of the transmitter and a part of the associated electrical circuitry to provide the MAIN, TEMP and DYNAMIC TEMP analog input signals to multiplexor 12. The pressure cell 14 is of the well known variable inductance type and has first and second inductors L1 and L2. The inductor L1 is connected by a resistor R3 to a positive DC voltage +V. The inductor L1 is also connected by a capacitor C1 to receive the drive (DRIVE) signal at input 14a. The inductor L2 is connected to circuit common (ground). Each inductor L1 and L2 also has resistance which is represented, in FIG. 2, by a resistor R1 connected in series with inductor L1 and a resistor R2 connected in series with inductor L2. The midpoint of the series combination 10 of inductors L1 and L2 is connected to output 14b.

Connected in parallel with pressure cell 14 between resistor R3 and capacitor C1, and circuit common are the series combination 16 of resisters R4 and R5 and the series combination 18 of resisters R8 and R9. The midpoint of series combination 16 is connected to output 14c and the midpoint of series combination 18 is connected to output 14d. The MAIN analog signal representative of the differential pressure is determined by sensing between outputs 14b and 14c. The DYNAMIC TEMP analog signal which is representative of the change in temperature across the pressure cell 14 is determined by sensing between outputs 14b and 14d. The series combination 20 of resisters R6 and R7 has one end connected to the positive DC voltage +V and the other end to circuit common. The TEMP analog signal which is representative of the temperature of the pressure cell 14 is determined by sensing between outputs 14b and 14e.

The pressure cell 14 also includes a core 15 and a diaphragm or other pressure transducer sensing element (not shown). The sensing element moves core 15 linearly inside the coils of inductors L1 and L2 in response to changes in pressure across the cell. The motion of the core 15 changes the inductance of inductors L1 and L2 to thereby change the amplitude of the AC voltage between the outputs 14b and 14c of cell 14. That AC voltage is then rectified by a rectifier circuit (not shown) and the DC level after rectification is measured.

The resistances of resisters R1 and R2 of inductors L1 and L2 will change with changes in the cell temperature. As the temperature of the cell changes, the DC voltage between the outputs 14b and 14e will also change. Since the DRIVE signal is provided to inductors L1 and L2 but not to resistive combination 20 the voltage at the output 14b will have a component of the DRIVE signal that is not included in the voltage at output 14e. Therefore, the voltage between terminals 14b and 14e must be passed through a low pass filter (not shown) in order to obtain the TEMP analog signal.

The resistive combination 18 is used to measure the changes in temperature across cell 14. As long as both coils L1 and L2 of the cell have the same temperature there isn't any change in the DC output voltage between terminals 14d and 14b. When the temperature changes dynamically across cell 14, the temperature of one of the two coils will change relative to the temperature of the other of the two coils. This causes the resistance of one of the coils to change relative to the resistance of the other of the coils thereby causing a change in the voltage between outputs 14d and 14b. The amplitude of the change is representative of the difference in temperature between the two coils. Series combinations 10 and 18 both receive the DRIVE signals. Therefore, the voltage at terminals 14b and 14d both include a component of the DRIVE signal and a DC voltage appears between the terminals.

In one embodiment for the pressure cell 14 and the associated electrical circuitry the resistors R4, R5, R8 and R9 were all of equal resistance. The resistor R6 was selected to have a resistance which was about 35 times the resistance of resistor R7. The voltage +V was selected to be 3 volts. The inductors L1 and L2 of pressure cell 14 had equal inductances of about 155 mH and the resistances of resistors R1 and R2 were each about 655 ohms.

Figure 3:
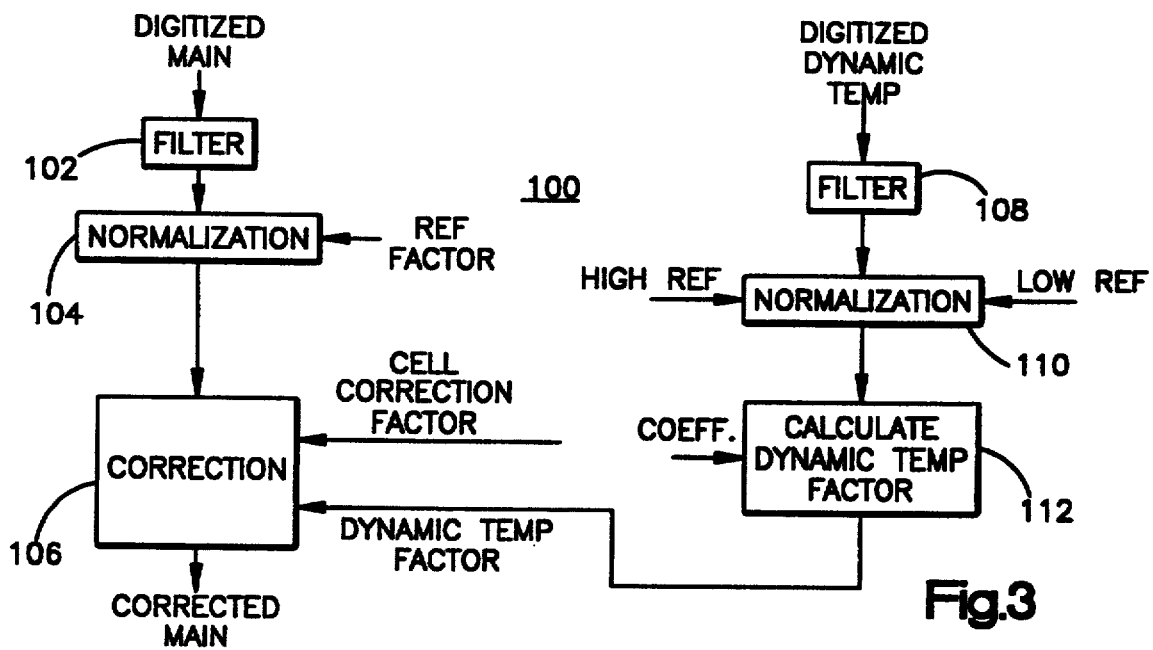
FIG. 3 is a flow diagram of the program included in the read only memory of the microprocessor of the embodiment shown in FIG. 1.

Referring now to FIG. 3, there is shown a simplified flow diagram 100 of the steps performed by microprocessor 24 in providing the digitized dynamic temperature compensated signal that becomes the 4–20 ma dynamic temperature compensated analog signal at the output of the transmitter. The steps shown in the flow diagram may, as is well known to those skilled in the art, be made up of a number of instructions. The flow diagram includes, as will be described in detail below, the steps for the dynamic temperature compensation method of the present invention. This method is used to correct the digitized MAIN signal representative of the differential pressure sensed by the transmitter for any changes therein arising from a difference in temperature across the pressure cell.

In step 102 the digitized MAIN signal is filtered to remove any noise therefrom. The technique used to perform the digital filtering need not be described as it can be any one of a number of digital filtering techniques well known to those skilled in the art. In step 104 the filtered digitized MAIN signal is normalized so that it is expressed as a percentage of a REF Factor which is the difference between the digitized HIGH REF and LOW REF signals after those digitized signals have been filtered in a manner similar to that used in step 102 for the digitized MAIN signal as follows:

$$\text{NORMALIZED MAIN} = \frac{\text{MAIN} - \text{LOW REF}}{\text{HIGH REF} - \text{LOW REF}}.$$

The normalizing of the MAIN signal eliminates any inaccuracies resulting from changes in the A/D converter 22 with changes in temperature and would not be needed if converter 22 does not change with changes in temperature.

In step 106, the normalized MAIN signal is corrected by a correction factor which depends on data supplied by the manufacturer of the pressure cell. Additionally, in step 106 the normalized MAIN signal is corrected for any change in temperature across the cell by subtracting therefrom a digital signal labeled as the DYNAMIC TEMP FACTOR. The DYNAMIC TEMP FACTOR is obtained from the digitized DYNAMIC TEMP signal in the manner described below.

As was described above, the analog DYNAMIC TEMP signal is digitized in A/D convertor 22. The digitized DYNAMIC TEMP signal is then filtered in step 108 to remove any noise therefrom. The filtering is accomplished in the same manner as the filtering for the digitized MAIN signal.

In step 110 the filtered digitized DYNAMIC TEMP signal is normalized by using the filtered digitized LOW REF and HIGH REF signals. The normalized DYNAMIC TEMP signal is expressed as a percentage of the HIGH REF and LOW REF signals. In step 112 a predetermined dynamic temperature coefficient (COEFF) based on measurements taken of the affect of a difference in temperature across the cell on the cell is used to calculate the DYNAMIC TEMP FACTOR by multiplying the normalized DYNAMIC TEMP signal by the COEFF. The COEFF can either be a constant or vary as a function of cell temperature. In step 106 the DYNAMIC TEMP FACTOR is subtracted from the normalized and digitized MAIN signal to provide a corrected MAIN signal.

While not shown in FIG. 3, the digitized DYNAMIC TEMP signal may be limited to fall within predetermined upper and lower limits on the dynamic temperature measured across the pressure cell prior to the filtering that occurs in step 108. The limiting controls overcorrection in the event that A/D convertor 22 does not properly function and allows faults in the measurement to be detected. The limiting is determined experimentally and is equivalent to the maximum temperature difference the pressure cell can experience in actual operation.

It should be appreciated that the method of the present invention uses the pressure cell to provide the signals that are used to compensate for the differences in temperature across the cell without using any other sensor and without affecting the measurement of pressure.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A computer based method for use with a means for sensing differential pressure, said method comprising the steps of:
   a) connecting first network means to said differential pressure sensing means, said first network means responsive to a drive signal for providing a signal representative of the difference in temperature across said differential pressure sensing means;
   b) applying said drive signal to said differential pressure sensing means and said first network means, said differential pressure sensing means responsive to said drive signal for providing a signal representative of said differential pressure sensed by said differential pressure sensing means;
   c) converting in analog to digital converting means said signal representative of said sensed differential pressure and said signal representative of said temperature difference across said differential pressure sensing means to digital signals; and
   d) correcting in computing means said digital signal representative of said sensed differential pressure comprising the steps of:
      i) calculating in said computing means a dynamic temperature factor signal by multiplying said digital signal representative of said temperature difference across said differential pressure sensing means by a coefficient based on measurements made of the affect of said temperature difference across said differential pressure sensing means on said differential pressure sensing means; and
      ii) subtracting in said computing means from said signal representative of the sensed differential pressure said dynamic temperature factor signal.

2. The method of claim 1 further comprising the steps of:
   a) connecting second network means to said differential pressure sensing means; and
   b) applying said drive signal to said second network means,
   said differential pressure sensing means and said second network means responsive to said drive signal for providing said signal representative of said sensed differential pressure.

3. The method of claim 1 wherein said differential pressure sensing means is of the variable inductance type.

4. The method of claim 1 wherein said temperature difference coefficient is a constant.

5. The method of claim 1 wherein said temperature difference coefficient varies as a function of the temperature of said differential pressure sensing means.

6. A pressure transmitter comprising:
   a) means for sensing differential pressure;
   b) first network means connected to said differential pressure sensing means;
   said differential pressure sensing means responsive to a drive signal for providing a signal representative of said sensed differential pressure, said first network means responsive to said drive signal for providing a signal representative of the difference in temperature across said differential pressure sensing means;
   c) computing means;
   d) means connected between said differential pressure sensing means and said computing means for converting said signal representative of said sensed differential pressure and said signal representative of said temperature difference across said differential pressure sensing means to digital signals; and
   e) said computing means comprising:
      i) means responsive to said digital signal representative of said temperature difference across said differential pressure sensing means and a coefficient based on measurements made of the affect of said temperature difference across said differential pressure sensing means on said differential pressure sensing means for calculating a dynamic factor signal by multiplying said digital signal representative of said temperature difference across said differential pressure sensing means by said coefficient; and
      ii) means responsive to said digital signal representative of said sensed differential pressure and said dynamic temperature factor signal for calculating a signal representative of said differential pressure sensed by said differential pressure sensing means for any affects of temperature difference across said differential pressure sensing means on said differential pressure sensed by said sensing means.

7. The pressure transmitter of claim 6 further comprising a second network means connected to said differential pressure sensing means, said second network means and said differential pressure sensing means responsive to said drive signal for providing said signal representative of said sensed differential pressure.

8. The pressure transmitter of claim 6 wherein said differential pressure sensing means is of the variable inductance type.

9. The pressure transmitter of claim 6 wherein said temperature change coefficient is a constant.

10. The pressure transmitter of claim 6 wherein said temperature difference coefficient varies as a function of the temperature of said differential pressure sensing means.

11. A pressure transmitter comprising:
   a) a cell for sensing differential pressure;
   b) a first network connected to said cell;
   said cell responsive to a drive signal for providing a signal representative of said sensed differential pressure, said first network responsive to said drive signal for providing a signal representative of the difference in temperature across said cell;

c) a computing device;

d) an analog to digital converter connected between said cell and said computing device for converting said signal representative of said sensed differential pressure and said signal representative of said temperature difference across said cell to digital signals; and e) said computing device comprising:
   i) means responsive to said digital signal representative of said temperature difference across said cell and a coefficient based on measurements made of the affect of said temperature difference across said cell on said cell for calculating a dynamic factor signal by multiplying said digital signal representative of said temperature difference across said cell by said coefficient; and
   ii) means responsive to said digital signal representative of said sensed differential pressure and said dynamic temperature factor signal for calculating a signal representative of said differential pressure sensed by said cell for any affects of temperature difference across said cell on said differential pressure sensed by said cell.

12. The pressure transmitter of claim 11 further comprising a second network connected to said cell, said second network and said cell responsive to said drive signal for providing said signal representative of said sensed differential pressure.

13. The pressure transmitter of claim 11 wherein said pressure cell is of the variable inductance type.

14. The pressure transmitter of claim 11 wherein said temperature difference coefficient is a constant.

15. The apparatus of claim 11 wherein said temperature difference coefficient varies as a function of the temperature of said cell.

* * * * *